April 26, 1932.   H. L. YOUNG   1,855,784
MEASURING AND MARKING APPARATUS
Filed Jan. 9, 1929
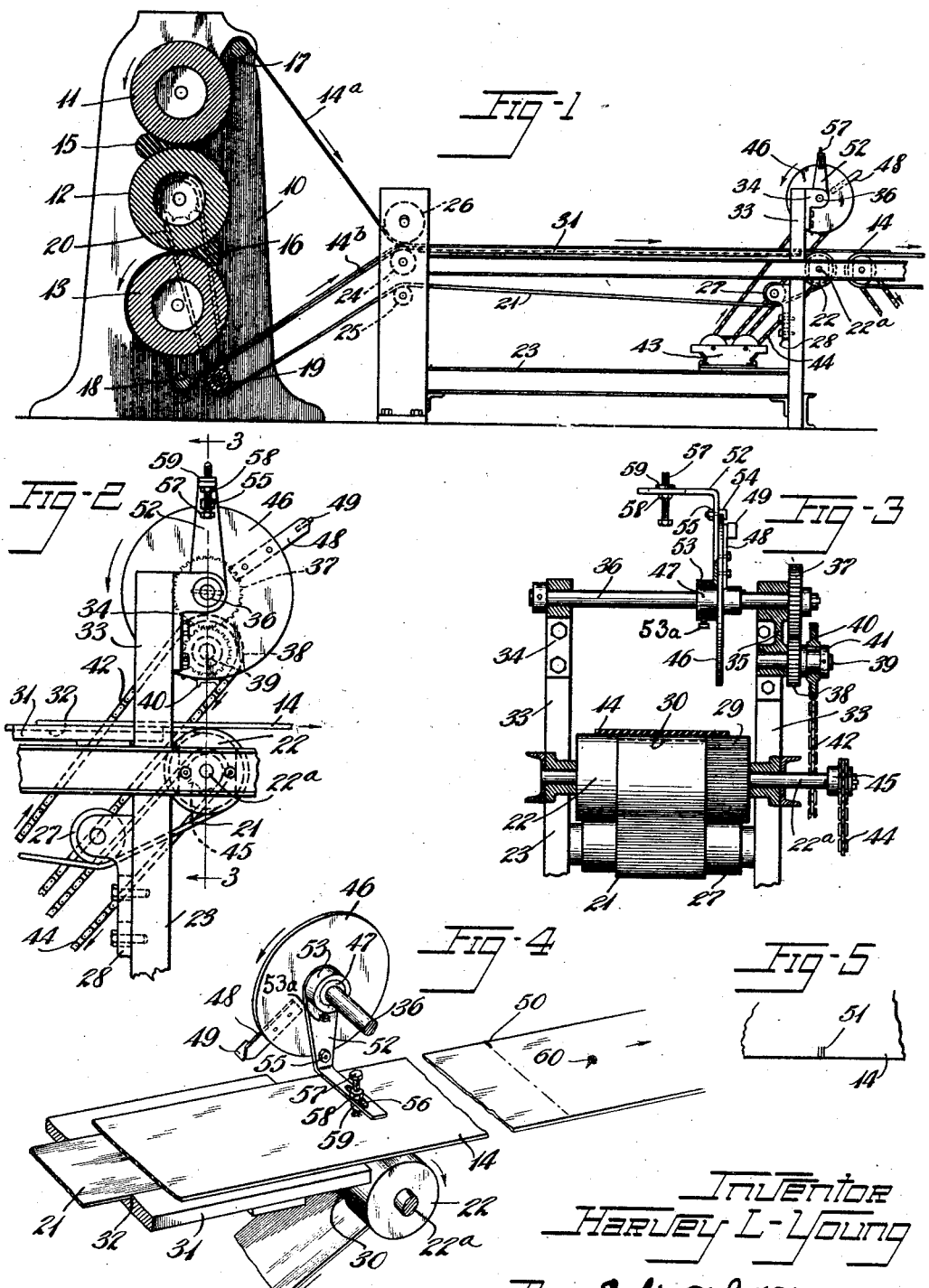

Patented Apr. 26, 1932

1,855,784

UNITED STATES PATENT OFFICE

HARVEY L. YOUNG, OF AKRON, OHIO, ASSIGNOR TO THE B. F. GOODRICH COMPANY, OF NEW YORK, N. Y., A CORPORATION OF NEW YORK

MEASURING AND MARKING APPARATUS

Application filed January 9, 1929. Serial No. 331,241.

This invention relates to measuring and marking apparatus, and more especially to means for impressing a mark or marks at determinate intervals upon a continuous strip of material.

The invention is especially useful for the manufacture of inner tubes for pneumatic tires, for example, in association with apparatus for feeding a continuous strip of unvulcanized plastic material from a strip forming calender to a tube-forming station, for the purpose of periodically impressing marks upon the continuous strip to indicate the position for a valve-pad to be applied thereto, and to indicate the place at which the tube is to be severed to provide individual lengths thereof.

The chief objects of the invention are to impress marks upon a continuous strip of material at periodic intervals; to provide simple and efficient apparatus for so impressing the marks; and to provide ready and wide adjustability for applying the marks selectively at various positions on the strip.

Of the accompanying drawings:

Fig. 1 is a side elevation of apparatus embodying my invention in its preferred form, and the work therein, in association with strip forming and feeding apparatus, a part of the latter being broken away and a part being in section.

Fig. 2 is a side elevation, on a larger scale, of the measuring and marking mechanism shown in Fig. 1.

Fig. 3 is a section on line 3—3 of Fig. 2.

Fig. 4 is a perspective view of parts of the apparatus in operative association with the work, parts being broken away for clearness of illustration.

Fig. 5 is a fragmentary plan view of a marginal portion of the work showing a mark thereon to indicate where the work is to be severed.

Referring to the drawings, 10 is one end-frame of a three-roll calender of known design, and 11, 12, 13 are interconnected driven rolls therein, the rolls being driven by any known or suitable means (not shown). Said rolls are adapted to form two strips of sheeted stock 14a, 14b, from respective banks of plastic material such as unvulcanized rubber 15, 16 which are fed into the bights of the rolls, 11, 12 and 12, 13 respectively. Respective guide-rollers 17, 18 are journaled in the calender-frames 10 adjacent the rolls 11, 13 to facilitate the removal of the strips 14a, 14b from the latter.

Journaled in the calender-frames 10 at the delivery side thereof adjacent the guide-roller 18 is a pulley 19 which is driven by a sprocket chain 20 from the hub of the calender-roll 12. The pulley 19 supports one end of an endless belt-conveyor 21 adapted to convey the strips 14a, 14b from the calender, the other end of the conveyor being mounted upon a pulley 22, journaled in a framework 23, at some distance from the calender and at a higher level than the pulley 19. At the end of the framework 23 nearest the calender the upper and lower reaches of the conveyor 21 pass over respective idler sheaves 24, 25, journaled in said framework, the sheave 24 being at the same elevation as the pulley 22. A floating presser-roll 26 is journaled in the framework 23 above the sheave 24 and is adapted to press together the strips 14a, 14b as the same are brought together on the conveyor 21, to form a composite two-ply strip 14. A tightening roll 27 is journaled in adjustably mounted brackets such as the bracket 28 and is adapted to keep the conveyor 21 in taut condition.

The embodiment of my invention herein shown is designed particularly for use with inner tube making apparatus wherein the flat, two-ply strip 14 subsequently is progressively folded and its respective lateral margins overlapped on each other in a longitudinal seam to provide a continuous tube which thereafter is severed to individual lengths. In the method described, the upper face of the strip 14 as shown in the drawings becomes the inner wall of the tube subsequently formed, thus requiring that the opposite face of the strip be marked in order that the mark will be visible on the tube formed therefrom.

For so marking the strip 14 I form one end portion of the pulley 22 with fine ridges or knurling 29 over which one margin of the strip 14 passes and the strip is locally embossed or marked by being periodically pressed thereagainst by mechanism presently to be described. The mark preferably is at the edge of the strip so that it is on the upper side of the folded tube and clearly visible to the operator who severs the same.

In order that the margin of the strip 14 may engage the pulley 22 and the strip remain in transversely flat position, a belt-conveyor 21 is provided which is somewhat narrower than the strip 14 so that the marginal portions of the latter extend beyond the lateral edges of the conveyor, and the peripheral face of the pulley 22 is centrally grooved as at 30 to receive the conveyor 21 so that the surface of the latter lies flush with the peripheral face of the pulley. Between the sheave 24 and pulley 22 the conveyor 21 is supported upon a board or table 31 which is mounted in the framework 23, the board 31 being formed with a central groove or recess 32 through which the conveyor moves, and the upper surface of the board being disposed flush with the top of the conveyor so as to support the marginal portions of the strip 14 in transversely flat position.

Mechanism for marking the strip 14 is mounted upon upward extensions 33, 33 rising from the framework 23 at opposite sides thereof. Journal brackets 34, 35 are mounted upon the respective front and rear extensions and support a shaft 36 journaled therein, said shaft being disposed above and parallel to a shaft 22a upon which the pulley 22 is mounted. The rear end of the shaft 36 is provided with a gear 37 meshed with a gear 38 journaled upon a stub-shaft 39 secured in the journal bracket 35, and the gear 38 has a laterally extending hub portion upon which is mounted a sprocket 40, the gear 38 being held on the stub-shaft 39 by a collar 41 secured thereto. The sprocket 40 is connected by a sprocket chain 42 to one side of a variable speed device 43, and the other side of the latter is connected by a sprocket chain 44 to a sprocket 45 mounted upon the shaft 22a.

Mounted upon the shaft 36 is a large disc 46 formed on each side with a hub portion 47 which is keyed to said shaft. Secured to the rear face of the disc 46 is a radial arm 48 which extends beyond the periphery of the disc and has its end portion provided with flat plate 49 disposed perpendicular to the plane of the arm. The position of the disc 46 axially of the shaft 36, and the length of the arm 48 is such that the outer edge of the plate 49 will engage the marginal portion of the strip 14, in a direction transversely of the strip, and momentarily bear thereagainst during each revolution of the shaft 36. The device impresses a mark upon the upper side of the strip 14, as shown at 50, Fig. 4 but this is not objectionable, as the strip is to be severed at that position after the strip is folded to tubular form, and the marked portion is eliminated in the subsequent splicing and trimming operation. The mark impressed on the opposite side of the strip, which serves to indicate where the strip is to be severed, is shown at 51, Fig. 5.

The arrangement is such that the conveyor 21 and shaft 22a are driven whenever the calender is in operation, and the shaft 36 is driven therefrom through variable speed mechanism which permits the speed of said shaft, with relation to the conveyor, to be varied within a substantial range, to alter the intervals during which the plate 49 engages the strip 14 and thus to vary the distance between the markings 51 on the latter. Although any speed differential between the feed of the strip 14 and the plate 49 will exert a scraping or rasping effect upon the work, yet the relatively short duration of contact, and the elasticity of the strip combine to neutralize this effect and I am able to drive the plate 49 at least fifteen percent faster or slower than the surface speed of the pulley 22 without deleterious effect upon the strip 14.

For periodically impressing marks upon the upper face of the strip 14, near the middle thereof, to indicate the position of valve-pads to be applied to the strip before it is folded to tubular form and severed, I provide an L-shaped bracket 52 one arm of which is apertured and fits over the hub 47 of the disc 46, and having its other arm disposed over the conveyor 21. A collar 53 is secured, by means of a set-screw 53a, on the hub 47 to prevent axial displacement of the bracket 52, and a bolt 54 having its head formed with a chordal slot which fits over the periphery of the disc 46 is secured to the bracket 52 by a nut 55 and prevents angular movement of the bracket 52 with relation to the disc, although readily permitting angular adjustment of the bracket.

That arm of the bracket 52 which extends over the conveyor 21 is formed with a longitudinal slot 56 in which is mounted a flat-nose bolt 57 provided with lock-nuts 58, 59 on opposite sides of the bracket-arm for holding the bolt in properly adjusted position in the slot. The bolt 57 is adapted to engage the strip 14 during each revolution of the shaft 36 to impress a mark 60 on the upper face of the sheet, which mark is utilized as a guide for positioning a valve-pad upon the strip, before the latter is folded to tubular form.

The arrangement is such that the bracket 52 may be positioned at various angles with relation to the arm 48, thus adapting the apparatus for the impressing of the mark 60 at any point between the marks 50 longitudinally of the strip 14.

The apparatus is simple in construction and continuous and automatic in its operation. It is substantially universal in its application to the impressing of marks at various regular intervals, longitudinally of the strip, and to impressing other marks at determinate positions with relation to the first mentioned marks.

The invention may be variously modified within the scope of the appended claims.

I claim:

1. Measuring and marking apparatus comprising means for feeding a strip of material, means for impressing indicia upon the opposite faces of the strip at determinate intervals as it is so fed, and means for varying the positioning of the indicia on one side of the sheet with relation to the indicia on the other side thereof.

2. Measuring and marking apparatus comprising a pulley, means for causing work to be fed over said pulley, a portion of said pulley being embossed, and means for locally pressing the work against said pulley at the embossed portion thereof and for locally pressing the work opposite the unembossed portion of the pulley respectively at determinate intervals.

3. Measuring and marking apparatus comprising a pulley over which the work is fed, said pulley being locally provided with an embossed portion, a single rotary member adapted to press the work against the pulley at its embossed portion and to press the work opposite the unembossed portion of the pulley at determinate positions, and driving means for said pulley and said rotatable member.

4. Apparatus as defined in claim 3 in which the driving means comprises means for driving the rotary member and the pulley at differential speeds.

5. Measuring and marking apparatus comprising a driven pulley for engaging one side of the work for feeding the same, said pulley being locally provided with an embossed portion, a single rotary member for engaging the opposite side of the work, means for driving said pulley and said rotary member, and a pair of presser members mounted upon said rotary member for local engagement with the work, said presser members being angularly adjustable with relation to each other.

In witness whereof I have hereunto set my hand this 8th day of January, 1929.

HARVEY L. YOUNG.